(12) United States Patent
Ionescu

(10) Patent No.: US 11,188,651 B2
(45) Date of Patent: Nov. 30, 2021

(54) HYPERVISOR-BASED INTERCEPTION OF MEMORY ACCESSES

(71) Applicant: CrowdStrike, Inc., Irvine, CA (US)

(72) Inventor: Ion-Alexandru Ionescu, Seattle, WA (US)

(73) Assignee: CrowdStrike, Inc., Irvine, CA (US)

( * ) Notice: Subject to any disclaimer, the term of this patent is extended or adjusted under 35 U.S.C. 154(b) by 1098 days.

(21) Appl. No.: 15/063,086

(22) Filed: Mar. 7, 2016

(65) Prior Publication Data

US 2017/0255778 A1 Sep. 7, 2017

(51) Int. Cl.
*G06F 21/57* (2013.01)
*G06F 21/55* (2013.01)
(Continued)

(52) U.S. Cl.
CPC .......... *G06F 21/57* (2013.01); *G06F 9/45558* (2013.01); *G06F 12/1416* (2013.01); *G06F 21/53* (2013.01); *G06F 21/54* (2013.01); *G06F 21/554* (2013.01); *G06F 2009/45583* (2013.01); *G06F 2221/034* (2013.01)

(58) Field of Classification Search
CPC ................. G06F 21/57; G06F 9/45558; G06F 2009/45583; G06F 2221/034
See application file for complete search history.

(56) References Cited

U.S. PATENT DOCUMENTS 7,478,237 B2 * 1/2009 Costea ................. G06F 21/564
713/164
8,607,009 B2 * 12/2013 Nicholas ............... G06F 9/4418
711/162
(Continued)

FOREIGN PATENT DOCUMENTS

WO WO2012135192 A2 10/2012

OTHER PUBLICATIONS

Wen etal "FVisor: Towards Thwarting Unauthorized File Accesses with a Lightweight Hypervisor," 2014 IEEE 17th International Conference on Computational Science and Engineering, pp. 620-626 (Year: 2014).*
(Continued)

*Primary Examiner* — Luu T Pham
*Assistant Examiner* — James J Wilcox
(74) *Attorney, Agent, or Firm* — Lee & Hayes, P.C.

(57) ABSTRACT

A security agent configured to initiate a security agent component as a hypervisor for a computing device is described herein. The security agent is further configured to determine a subset of memory locations in memory of the computing device to be intercepted. The security agent component may then set intercepts for the determined memory locations. Setting such intercepts may include setting privilege attributes for pages which include the determined memory locations so as to prevent specific operations in association with those memory locations. In response to one of those specific operations, the security agent component may return a false indication of success or allow the operation to enable monitoring of the actor associated with the operation. When an operation affects another memory location associated with one of the pages, the security agent component may temporarily reset the privilege attribute for that page to allow the operation.

22 Claims, 6 Drawing Sheets

(51) Int. Cl.
  *G06F 12/14* (2006.01)
  *G06F 21/53* (2013.01)
  *G06F 21/54* (2013.01)
  *G06F 9/455* (2018.01)

(56) References Cited

U.S. PATENT DOCUMENTS

| | | | |
|---|---|---|---|
| 9,563,569 B2* | 2/2017 | Tsirkin | G06F 9/45558 |
| 9,996,370 B1* | 6/2018 | Khafizov | G06F 9/5077 |
| 10,033,759 B1* | 7/2018 | Kabra | G06F 9/45558 |
| 10,423,435 B1* | 9/2019 | Khafizov | G06F 12/08 |
| 2012/0047313 A1* | 2/2012 | Sinha | G06F 9/45558 |
| | | | 711/6 |
| 2013/0086299 A1* | 4/2013 | Epstein | G06F 12/1433 |
| | | | 711/6 |
| 2013/0152207 A1 | 6/2013 | Cui et al. | |
| 2013/0283370 A1 | 10/2013 | Vipat et al. | |
| 2013/0333040 A1* | 12/2013 | Diehl | H04L 63/1491 |
| | | | 726/24 |
| 2015/0261690 A1* | 9/2015 | Epstein | G06F 9/45558 |
| | | | 711/152 |
| 2016/0148001 A1* | 5/2016 | Bacher | G06F 9/542 |
| | | | 713/189 |
| 2016/0299712 A1* | 10/2016 | Kishan | G06F 3/0604 |
| 2017/0024560 A1* | 1/2017 | Linde | G06F 21/554 |
| 2017/0109530 A1* | 4/2017 | Diehl | H04L 63/1441 |
| 2017/0177392 A1* | 6/2017 | Bacher | G06F 21/53 |
| 2017/0177398 A1* | 6/2017 | Bacher | G06F 21/53 |
| 2017/0213031 A1* | 7/2017 | Diehl | G06F 21/568 |
| 2018/0285143 A1* | 10/2018 | Bacher | G06F 9/45558 |
| 2020/0159558 A1* | 5/2020 | Bak | G06F 12/109 |
| 2020/0394065 A1* | 12/2020 | Bak | G06F 12/023 |
| 2021/0049292 A1* | 2/2021 | Ionescu | G06F 21/53 |

OTHER PUBLICATIONS

The Extended European Search Report dated Jul. 13, 2017 for European patent application No. 17156043.6, 10 pages.

* cited by examiner

HYPERVISOR-BASED INTERCEPTION OF MEMORY ACCESSES

BACKGROUND

With Internet use forming an ever greater part of day to day life, security exploits that steal or destroy system resources, data, and private information are an increasing problem. Governments and businesses devote significant resources to preventing intrusions and thefts related to these security exploits. Security exploits come in many forms, such as computer viruses, worms, trojan horses, spyware, keystroke loggers, adware, and rootkits. These exploits are delivered in or through a number of mechanisms, such as spearfish emails, clickable links, documents, executables, or archives. Some of the threats posed by security exploits are of such significance that they are described as cyber terrorism or industrial espionage.

While many activities of security exploits can be introspected using hooks or other interception techniques, certain operations cannot be hooked or intercepted in kernel-mode or user-mode. Such operations include memory accesses and individual instruction execution by the processor. Current techniques involve running guest operating systems (OSes) and applications of those guest OSes in virtual machines or running each application in a separate virtual machine. Each of these techniques involves significant overhead, and neither technique is capable of intercepting memory accesses or instructions executing on the host OS itself.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, security agent configured to initiate a security agent component as a hypervisor for a computing device. Such initiation may involve, in some implementations, storing processor state information into a data structure and instructing the processor to initiate the security agent component as the hypervisor based on the data structure. The security agent may then determine a subset of memory locations in memory of the computing device to be intercepted. Such a determination may be based, for example, on a security agent configuration received from a security service. The security agent component may then set intercepts for the determined memory locations. Setting such intercepts may include setting privilege attributes for pages which include the determined memory locations so as to prevent specific operations in association with those memory locations.

In some implementations, after setting privilege attributes for pages, operations affecting memory locations in those pages may be noted. In response to one of the specific operations affecting the determined memory location associated with a page, the security agent component may return a false indication of success or allow the operation to enable monitoring of the actor associated with the operation. When an operation affects another memory location associated with that page, the security agent component may temporarily reset the privilege attribute for that page to allow the operation.

In one example, a memory location may store privileged information, and the specific operation protected against may involve writing to that memory location to modify the privileged information. Such an action is known as privilege escalation. To protect against privilege escalation, the privilege attribute of the page including the memory location storing the privileged information may be set to a read only value.

In another example, a memory location may store user credentials, and the specific operation protected against may involve reading the user credentials from the memory location. To protect against such credential reads, the privilege attribute of the page including the memory location storing the user credentials may be set to an inaccessible value. In some implementations, the physical memory location of the page may be modified by the security agent, resulting in the credential read to return data located in a different memory location. The returned user credentials would therefore be invalid as to purposefully mislead an attacker.

Overview

Figure 1:
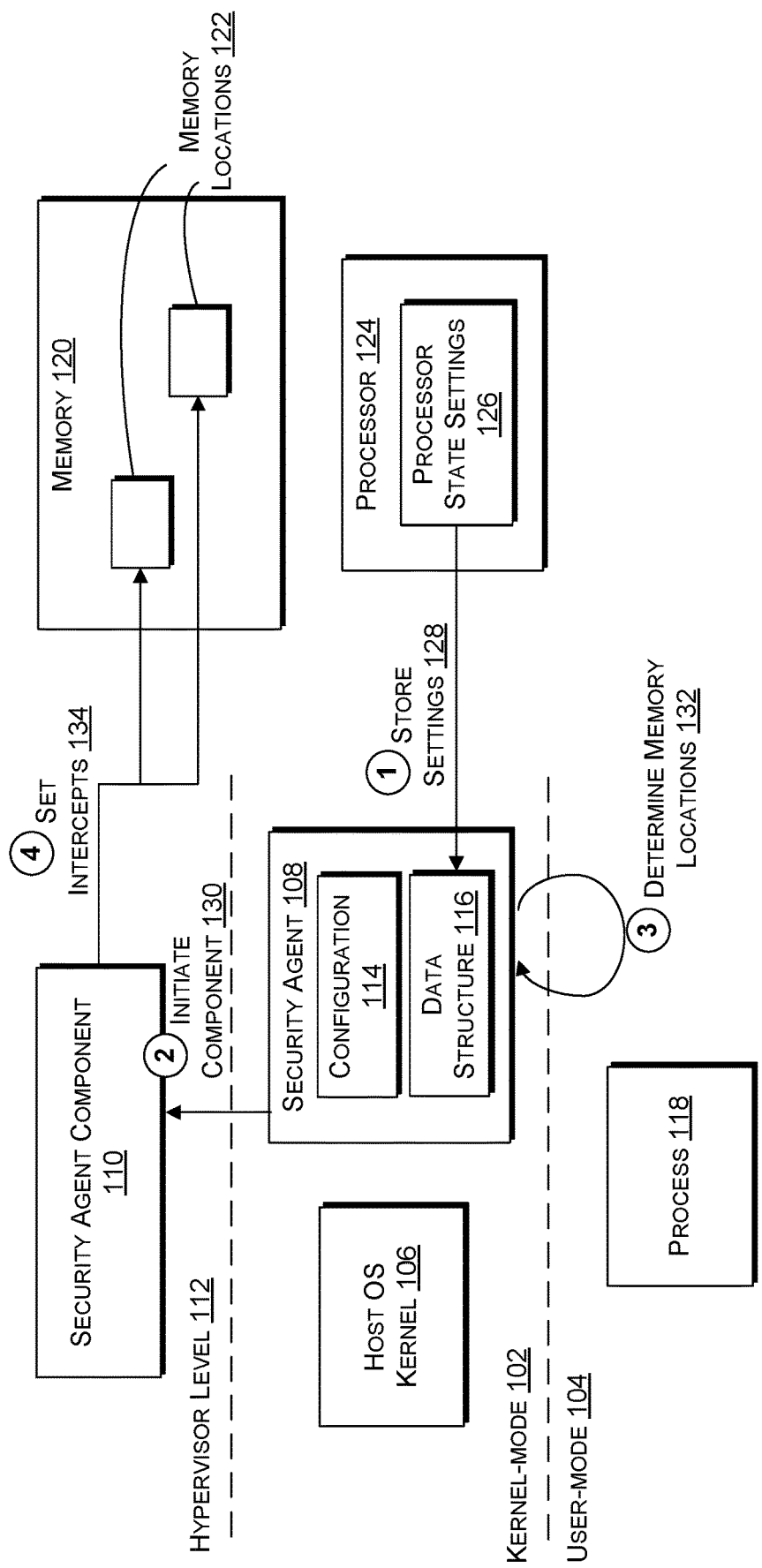
FIG. 1 illustrates an overview of a security agent configured to initiate execution of a security agent component as a hypervisor of computing device, the security agent component setting intercepts on a subset of memory locations of the computing device.

FIG. 1 illustrates an overview of a security agent configured to initiate execution of a security agent component as a hypervisor of computing device, the security agent component setting intercepts on a subset of memory locations of the computing device. As illustrated, a computing device includes components implemented at the kernel-level 102 and at the user-level 104. Kernel-level 102 components include a host OS kernel 106 and a security agent 108. The security agent 108 further includes or is associated with a security agent component 110 implemented at a hypervisor-level 112 of the computing device. The security agent 108 may further include a configuration 114 and a data structure 116 for storing copies of processor state settings. Further, user-level 104 components may include a process 118. Additionally, the computing device may have a memory 120 having multiple memory locations 122 and a processor 124 having processor state settings 126. FIG. 1 further shows, at 128, the security agent 108 storing processor state settings 126 in the data structure 116 and, at 130, initiating the security agent component 110 as a hypervisor based on the data structure 130. The security agent 108 then, at 132, determines memory locations 122 to be intercepted and the security agent component 110 sets, at 134, intercepts for the determined memory locations 122.

Figure 3:
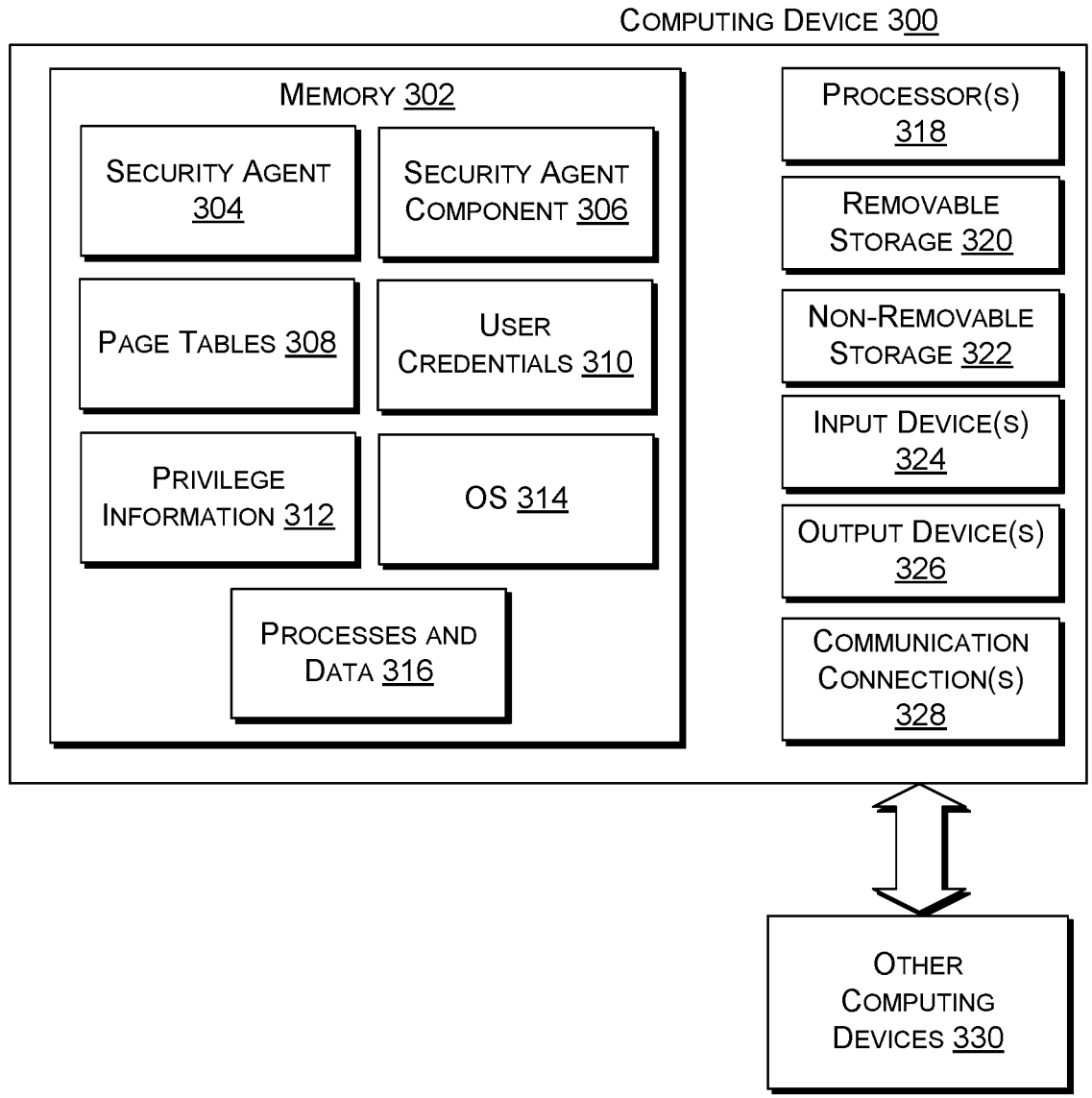
FIG. 3 illustrates a component level view of a computing device configured with a security agent and security agent component configured to execute as a hypervisor.

In various embodiments, a computing device may include the host OS kernel 106, security agent 108, security agent component 110, process 118, memory 120, and processor 124. Such a computing device may be a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. When implemented on multiple computing devices, the host OS kernel 106, security agent 108, security agent component 110, process 118, memory 120, and processor 124 may be distributed among the multiple computing devices. An example of a computing device including the host OS kernel 106, security agent 108, security agent component 110, process 118, memory 120, and processor 124 is illustrated in FIG. 3 and described below with reference to that figure.

The computing device may implement multiple protection rings or privilege levels which provide different levels of access to system resources. For example, user-level 104 may be at an "outer" ring or level, with the least access (e.g., "ring 3"), kernel-level 102 may be at an "inner" ring or level, with greater access (e.g., "ring 0" or "ring 1"), and hypervisor-level 112 may be an "inner-most" ring or level (e.g., "ring −1" or "ring 0"), with greater access than kernel-level 102. Any component at the hypervisor-level 112 may be a hypervisor which sits "below" (and has greater access than) a host OS kernel 106.

The host OS kernel 106 may be a kernel of any sort of OS, such as a Windows® OS, a Unix OS, or any other sort of OS. Other OSes, referred to as "guest" OSes, may be implemented in virtual machines supported by the host OS. The host OS kernel 106 may provide access to hardware resources of the computing device, such as memory 120 and processor 124 for other processes of the computing device, such as process 118.

The security agent 108 may be a kernel-level security agent, which may monitor and record activity on the computing device, may analyze the activity, and may generate alerts and events and provide those alerts and events to a remote security service. The security agent 108 may be installed by and configurable by the remote security service, receiving, and applying while live, configurations of the security agent 108 and its component(s), such as security agent component 110. The configuration 114 may be an example of such a configuration. An example security agent 108 is described in greater detail in U.S. patent application Ser. No. 13/492,672, entitled "Kernel-Level Security Agent" and filed on Jun. 8, 2012, which issued as U.S. patent number on May 26, 2015.

The security agent component 110 may be a component of the security agent 108 that is executed at a hypervisor for the computing device at hypervisor-level 112. The security agent component 110 may perform hypervisor functions, such as adjusting privilege attributes (e.g., "read-write," "read only," "inaccessible," etc.) of memory pages and managing system resources, such as memory 120. The security agent component 110 may perform at least some of its functions based on the configuration 114 of the security agent 108, which may include configuration settings for the security agent component 110. The security agent component 110 may also perform hypervisor functions to adjust the physical location of memory pages associated with memory 120.

The configuration 114 may comprise any of settings or system images for the security agent 108 and security agent component 110. As noted above, the configuration 114 may be received from a remote security service and may be applied by the security agent 108 and security agent component 110 without rebooting the computing device.

The data structure 116 may be a structure for storing processor state information. Such as data structure may be, for instance, a virtual machine control structure (VMCS). In some implementations, a subset of the settings in the data structure 116 may be set by the security agent 108 based on the OS. In such implementations, the security agent 108 may have different routines for different OSes, configuring the data structure 116 with different settings based on the OS. Such settings may typically be processor state settings which are invariant for a given OS. Other settings are then obtained from processor state settings 126. In other implementations, the security agent 108 may not have different routines for different OSes and may obtain all settings for the data structure 116 from the processor state settings 126.

In various implementations, the process 118 may be any sort of user-level 104 process of a computing device, such as an application or user-level 104 OS component. The process 118 may perform various operations, including issuing instructions for execution and making read and write requests of different memory locations. Such read and write requests may be addressed to virtual addresses, which may be mapped to physical addresses of memory pages by page tables of the OS kernel 106 or to further virtual addresses of extended or nested page tables, which are then mapped to physical addresses. Such processes 118 may include security exploits or be controlled by such exploits though vulnerabilities and may attempt malicious activity, such as privilege escalation or credential theft, through direct accesses of memory locations or indirect accesses utilizing, for example, vulnerabilities of the host OS kernel 106.

Memory 120 may be memory of any sort of memory device. As shown in FIG. 1, memory 120 may include multiple memory locations 122, the number of memory locations 122 varying based on the size of memory 120. The memory locations 122 may be addressed through addresses of memory pages and offsets, with each memory page including one or more memory locations. Privileges associated with memory locations 122, such as reading and writing, may be set on a per-page granularity, with each memory page having a privilege attribute. Thus, memory locations 122 of a same page may have the same privileges associated with them. Examples of memory 120 are illustrated in FIG. 3 and described below in detail with reference to that figure.

The processor 124 may be any sort of processor, such as a central processing unit (CPU), a graphics processing unit (GPU), or both CPU and GPU, or other processing unit or component known in the art. The processor 124 may be associated with a data structure describing its state, the contents of which are referred to herein as the processor state settings 126. As described above, in some implementations, a subset of the processor state settings 126 may be invariant for a type of OS. Additionally, the processor 124 supports hardware-based virtualization (such as Intel™ VT-x) with second level address translation (SLAT).

In various implementations, the security agent 108 is configured to initiate execution of the security agent component 110 as a hypervisor. Such initiating may be performed without any rebooting of the computing device. As shown in FIG. 1, this initiating may involve, at 128, storing the processor state settings 126 in the data structure 116. If any of the processor state settings 126 are invariant, they may have already been included in the data structure 116 by the security agent 108 and thus do not need to be stored again. The initiating may then include, at 130, initiating the security agent component 110 based on the data structure 116. This may involve providing a reference to the security agent component 110 and the data structure 116 along with a "run" instruction.

Next, the security agent 108 determines, at 132 any memory locations 122 or instructions to be intercepted. The security agent 108 may utilize the configuration 114 provided by the security service to determine the memory locations 122 and instructions. Such memory locations 122 may include locations storing privilege information (e.g., indications of admin privileges) for a process or user credentials (e.g., passwords). As mentioned above, updates to the configuration 114 may be received and applied without rebooting. Upon receiving an update to the configuration 114, the security agent may repeat the determining at 132.

To free memory space, computing devices often clear memory mappings for memory pages which have not been recently accessed and write out their contents to disk, referred to as a page-out operation. When memory is accessed again, the contents are brought back from disk, referred to as a page-in operation. To ensure, then, that knowledge of memory locations 122 stays up-to-date, the security agent 108 may request that the OS kernel 106 lock page tables of mappings in page tables to memory pages which include the memory locations 122 that are to be intercepted. Alternatively, the security agent component 110 may intercept page out requests and prevent paging out of memory pages which include the memory locations 122 that are to be intercepted, or it may intercept page in requests in order to update its knowledge of memory locations 122 and repeat determining at 132.

In various implementations, the security agent component 110 then, at 134, sets intercepts for the instructions and memory locations 122 determined by the security agent 108. In some implementations, setting intercepts may involve determining the memory pages which include the determined memory locations 122 and setting privilege attributes for those pages. The privilege attribute chosen—e.g., "read only" or "inaccessible"—may be a function of the memory accesses that the security agent 108 and security agent component 110 are configured to intercept. When a process 118 seeks to perform such a memory access—e.g., to write to a memory page marked "read only"—the security agent component 110 will receive notification.

In other implementations, setting intercepts may involve changing the physical memory location of the determined memory locations 122 to reference misleading, incorrect, or otherwise unusable data. When a process 118 seeks to perform such memory access—e.g., to read a memory page containing data at memory location 122, the data will instead by read from an alternate memory location.

In some implementations, upon termination of a process 118, the security agent component 110 may remove intercepts for memory locations 122 associated with the process 118. This may involve resetting privilege attributes for the memory pages including the memory locations 122 to their previous settings, or it may include resetting the physical memory location for the memory pages.

Figure 2A:
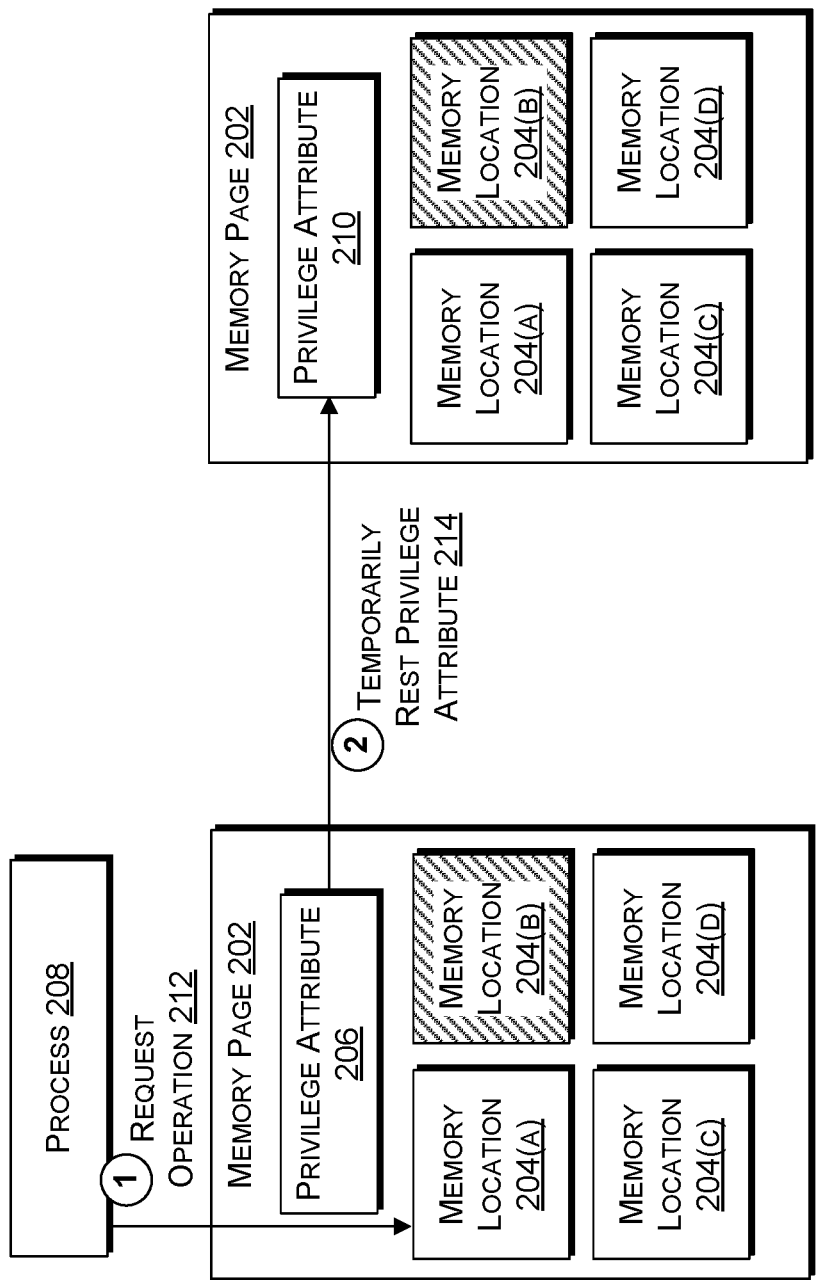
FIGS. 2a-2b illustrate overviews of techniques for protecting memory locations through privilege attributes of pages while enabling operations on other memory locations associated with those pages.
Figure 2B:
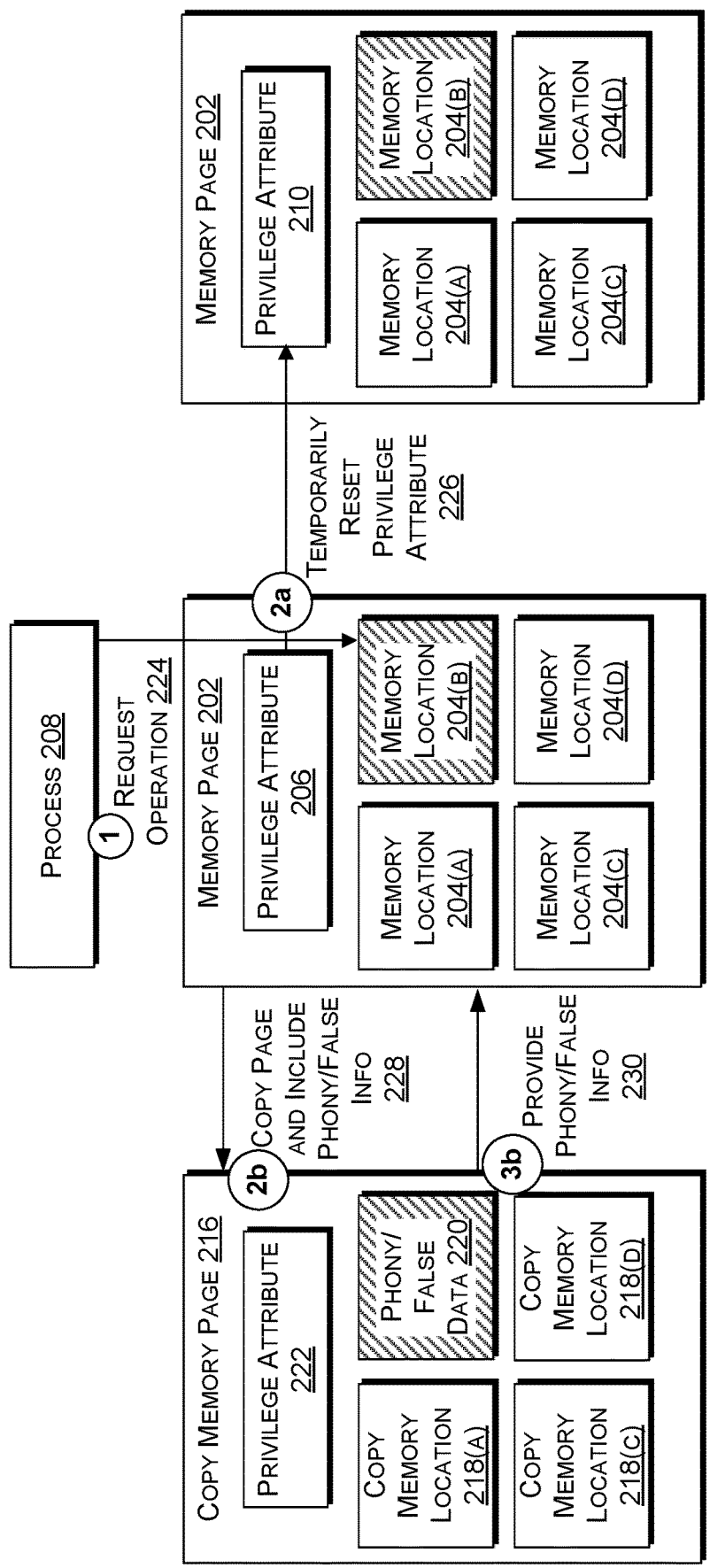

FIGS. 2a-2b illustrate overviews of techniques for protecting memory locations through privilege attributes of pages while enabling operations on other memory locations associated with those pages. FIG. 2a includes a memory page 202 having at least memory location 204(a), memory location 204(b), memory location 204(c), and memory location 204(d), as well as privilege attribute 206. Further, a process 208, as shown, may make requests associated with the memory locations 204. Also, as shown in FIG. 2a, that privilege attribute 206 may be temporarily reset to privilege attribute 210. A process 208 may, at 212, request an operation not permitted by privilege attribute 206. Because the operation may be directed to memory location 204(a), which is not one of the memory locations determined by the security agent 108, the security agent component 110 may, at 214, temporarily reset the privilege attribute 206 to privilege attribute 210 to allow the operation to proceed.

In various implementations, memory page 202 may be an example of the memory pages discussed above with reference to memory 120, memory locations 204 may be examples of memory locations 122, and privilege attributes 206 and 210 may be examples of the privilege attributes discussed above with reference to memory 120. Further, process 208 may be an example of process 118.

Process 208 may request, at 212, an operation such as a read from or write to a memory location 204. Upon noting the request, the security agent component 110 may determine the memory page 202 associated with the request as well as the specific memory location 204 on that memory page 202. The security agent component 110 then determines if the memory location is one of the memory locations identified by the security agent 108. In FIG. 2a, the memory location 204 identified by the security agent 108 is memory location 204(b), and the operation is a request associated with memory location 204(a). In such an example, if the operation does not conflict with the privilege attribute 206, the operation is allowed to proceed. If, on the other hand, the operation is not permitted by the privilege attribute, then the security agent component 110 may, at 212, temporarily reset the privilege attribute 206 to privilege attribute 210 to allow the operation to proceed. For example, if privilege attribute 206 is "inaccessible" (e.g., to prevent reads of user credentials stored at memory location 204(b)), the security agent component 110 may temporarily reset the privilege attribute 206 to be privilege attribute 210, which may be "read only." After the operation has been processed, the security agent component 110 may return the privilege attribute 210 to be privilege attribute 206.

FIG. 2b includes a memory page 202 having at least memory location 204(a), memory location 204(b), memory location 204(c), and memory location 204(d), as well as privilege attribute 206. A process 208, as shown, may make requests associated with the memory locations 204, and privilege attribute 206 may be temporarily reset to privilege attribute 210. As is further illustrated, copies of information stored in memory page 202 may be stored in a copy memory page 216. The copy memory page 216 may include copy memory location 218(a), which includes a copy of the information stored at memory location 204(a); copy memory location 218(c), which includes a copy of the information stored at memory location 204(c); and copy memory location 218(d), which includes a copy of the information stored at memory location 204(d). Rather than storing a copy of the information from memory location 204(b), the copy memory page 216 may include phony/false or deceptive data 220. The copy memory page 216 may also include a privilege attribute 222, which may represent elevated privileges when compared to privilege attribute 206.

As illustrated, the process 208 may, at 224, request an operation affecting memory location 204(b). Because 204(b) is one of the memory locations identified by the security agent 108, the security agent component 110 may respond in one of a number of ways. At 226, the security agent component 110 may temporarily reset the privilege attribute 206 to be privilege attribute 210 in order to allow the operation to proceed. The security agent component 110 may then also identify the process, thread, or component that made the request for the operation at 224 and may monitor further activity of that process, thread, or component or terminate that process, thread, or component. Alternatively, the security agent component 110 may, at 228 generate copy memory page 216, including the phony/false or deceptive data 220, and may, at 230, allow the process 208 to access the phony/false or deceptive data 220.

Process 208 may request, at 224, an operation such as a read from or write to a memory location 204. Upon noting the request, the security agent component 110 may determine the memory page 202 associated with the request as well as the specific memory location 204 on that memory page 202. The security agent component 110 then determines whether the memory location is one of the memory locations identified by the security agent 108. In FIG. 2b, the memory location 204 identified by the security agent 108 is memory location 204(b), and the operation is a request associated with memory location 204(b). Accordingly, the security agent component 110 determines that the memory location 204(b) is one of the memory locations identified by the security agent 108. In response, the security agent component 110 may take no action, which may result in the computing device crashing and rebooting. Alternatively, the security agent component may take action to allow the operation and monitor further operation, allow the operation to occur on phony/false or deceptive data 220, or to provide a false indication of success to the process 208.

In a first example, the operation request at 224 may be a write operation to modify privilege information stored at memory location 204(b). In response to the request for the write operation, the security agent component 110 may allow the operation to proceed by temporarily resetting, at 226, the privilege attribute 206 to be privilege attribute 210. The security agent component 110 may also identify the process, thread, or component that made the request for the write operation (i.e., process 208) and may monitor further activity of that process, thread, or component. Alternatively, the security agent component 110 may copy, at 228, the contents of memory page 202 to copy memory page 216, set the privilege attribute 22 to read-write, and temporarily redirect from memory page 202 to copy memory page 216. The security agent component 110 may then allow the write operation to proceed, and the process 208 may modify the copy memory page 216 and receive an indication of success. The security agent component 110 may then return mapping to point to memory page 202. Thus, the memory location 204(b) is protected, the process 208 is tricked into thinking it succeeded, and both objectives are achieved without the computing device crashing.

In a second example, the operation request at 224 may be a read operation to obtain user credentials stored at memory location 204(b). In response to the request for the read operation, the security agent component 110 may allow the operation to proceed by temporarily resetting, at 226, the privilege attribute 206 to be privilege attribute 210. The security agent component 110 may also identify the process, thread, or component that made the request for the read operation (i.e., process 208) and may monitor further activity of that process, thread, or component. Alternatively, the security agent component 110 may copy, at 228, the contents of memory page 202 to copy memory page 216, set the privilege attribute 22 to read only, and temporarily redirect from memory page 202 to copy memory page 216. In addition to copying the contents of memory page 202, the security agent component 110 may store phony/false or deceptive data 220 at the same offset in copy memory page 216 as the memory location 204(b) is in memory page 202. The security agent component 110 then allows the read operation to proceed, and the process 208 read the phony/false or deceptive data 220. After the read operation, the security agent component 110 may then return mapping to point to memory page 202. If the process 208 obtained deceptive data 220, such as a username and password for a monitored account, then future use of that username and password may trigger monitoring by the security agent 108 and/or the security agent component 110.

Example System

FIG. 3 illustrates a component level view of a computing device configured with a security agent and security agent component configured to execute as a hypervisor. As illustrated, computing device 300 comprises a memory 302 storing a security agent 304, a security agent component 306, page tables 308, user credentials 310, privilege information 312, an OS 314, and processes and data 316. Also, computing device 300 includes processor(s) 318, a removable storage 320 and non-removable storage 322, input device(s) 324, output device(s) 326 and communication connections 328 for communicating with other computing devices 330.

In various embodiments, memory 302 is volatile (such as RAM), non-volatile (such as ROM, flash memory, etc.) or some combination of the two. Memory 302 may be an example of memory 120, which is described above in detail with respect to FIG. 1. The security agent 304 may be an example of security agent 108, which is described above in detail with respect to FIG. 1. The security agent component 306 may be an example of security agent component 110, which is described above in detail with respect to FIG. 1. Page tables 308 may be any sort of page tables, such as page tables mapping virtual addresses to physical addresses of memory pages. Uses of such page tables 308 are described above in detail with respect to FIG. 1 and FIGS. 2a-2b. User credentials 310 may be any sort of user credentials, such as user names and passwords for one or more processes or components. Privilege information 312 may be indications of privileges, such as admin privileges for processes, threads, user accounts, etc. The OS 314 may be any sort of OS, such as the host OS kernel 106 described above in detail with respect to FIG. 1. The processes and data 316 may be any sort of processes and data, such as process 118, which is described above in detail with respect to FIG. 1, or process 208, which is described above in detail with respect to FIGS. 2a-2b.

In some embodiments, the processor(s) 318 is a central processing unit (CPU), a graphics processing unit (GPU), or both CPU and GPU, or other processing unit or component known in the art. Processor 318 supports hardware-based virtualization (such as Intel™ VT-x) with second level address translation (SLAT). Processor(s) 318 may be an example of processor 124, which is described above in detail with respect to FIG. 1.

Computing device 300 also includes additional data storage devices (removable and/or non-removable) such as, for example, magnetic disks, optical disks, or tape. Such additional storage is illustrated in FIG. 3 by removable storage 320 and non-removable storage 322. Non-transitory computer-readable media may include volatile and nonvolatile, removable and non-removable tangible, physical media implemented in technology for storage of information, such as computer readable instructions, data structures, program modules, or other data. System memory 302, removable storage 320 and non-removable storage 322 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the computing device 300. Any such non-transitory computer-readable media may be part of the computing device 300.

Computing device 300 also has input device(s) 324, such as a keyboard, a mouse, a touch-sensitive display, voice input device, etc., and output device(s) 326 such as a display, speakers, a printer, etc. These devices are well known in the art and need not be discussed at length here.

Computing device 300 also contains communication connections 328 that allow the computing device 300 to communicate with other computing devices 330, such as device (s) of a remote security service.

Example Processes

Figure 4:
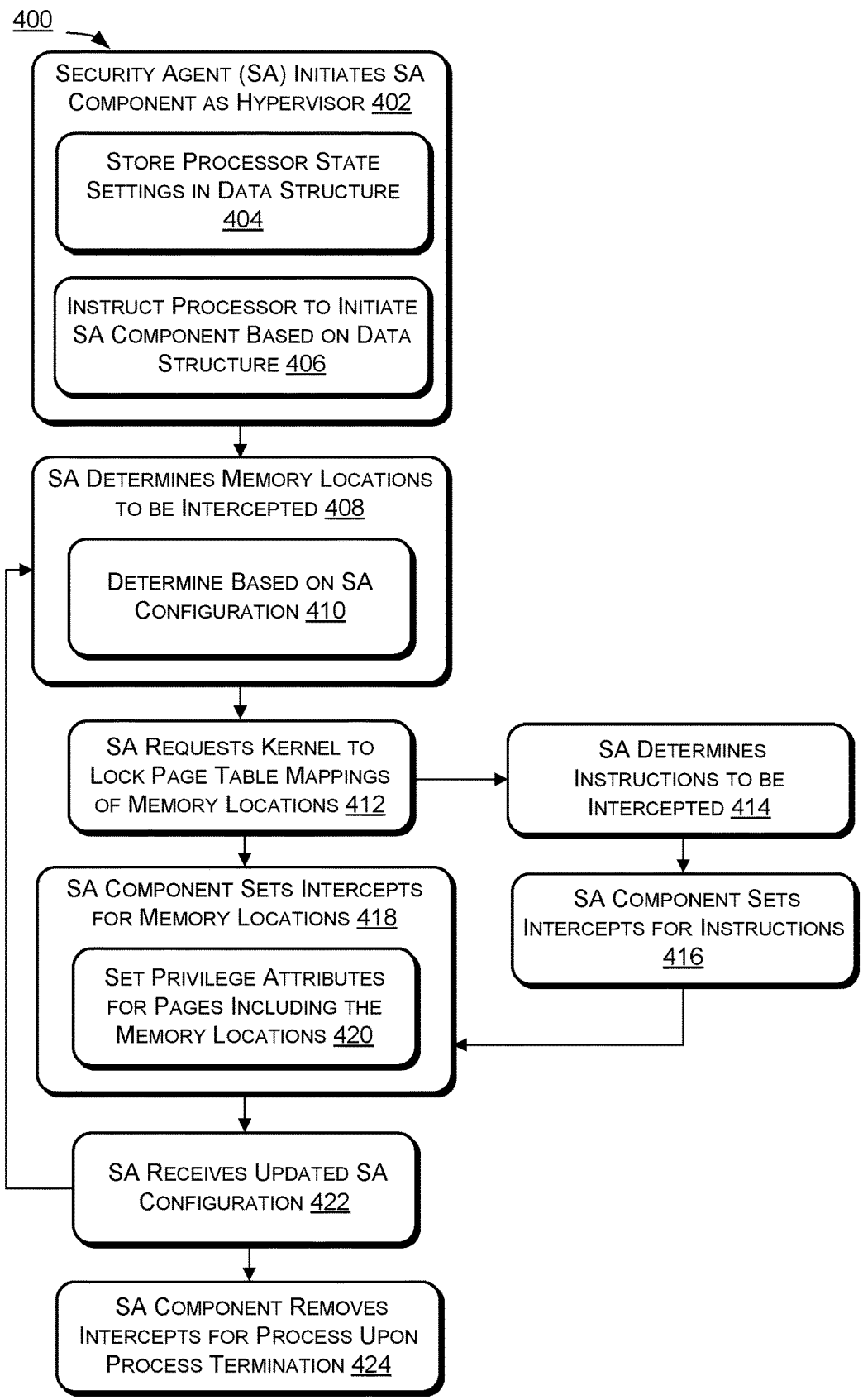
FIG. 4 illustrates an example process for initiating execution of a security agent component as a hypervisor for a computing device, determining memory locations of the computing device to be intercepted, and setting intercepts for the determined memory locations.
Figure 5:
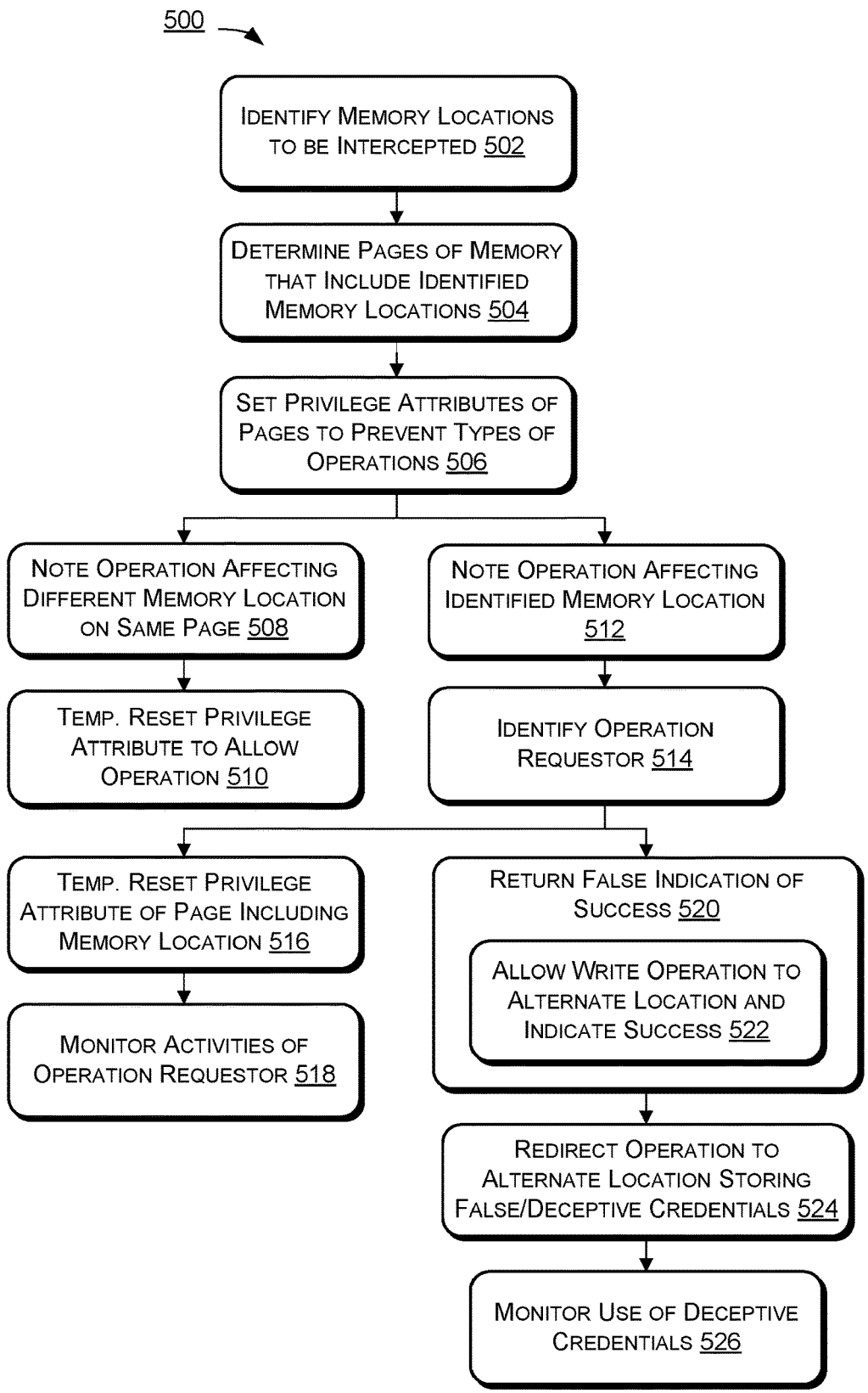
FIG. 5 illustrates an example process for protecting memory locations through privilege attributes of pages while enabling operations on other memory locations associated with those pages.

FIGS. 4-5 illustrate example processes 400 and 500. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process for initiating execution of a security agent component as a hypervisor for a computing device, determining memory locations of the computing device to be intercepted, and setting intercepts for the determined memory locations. The process 400 includes, at 402, a security agent on a computing device initiating a security agent component as a hypervisor for the computing device. The initiating may include, at 404, storing processor state settings in a data structure and, at 406, instructing a processor of the computing device to initiate the security agent component as the hypervisor based on the data structure. In some implementations, the security agent may include different routines for different operating systems, each of the different routines fixing as invariant a part of the data structure associated with the respective different operating system.

At 408, the security agent may then determine a subset of memory locations in the memory to be intercepted. At 410, the security agent may determine the subset based on a security agent configuration received from a security service.

At 412, the security agent may request that an operating system kernel of the computing device lock page table mappings of the memory locations of the subset of memory location.

At 414, the security agent may determine instructions to be intercepted and, at 416, the security agent component mat set intercepts for the determined instructions. The operations at 414 and 416 may also be performed before the operations show at 408-412 or concurrently with those operations.

At 418, the security agent component may set intercepts for memory locations of the determined subset of memory locations. At 420, setting the intercepts may include setting privilege attributes for pages which include the memory locations of the determined subset of memory locations, or it may include changing the physical memory location of such pages.

At 422, the security agent may receive an updated security agent configuration and, without rebooting, repeat the determining of the subset of memory locations at 408 and cause the security agent component to repeat the setting of the intercepts at 418.

At 424, the security agent component may remove intercepts corresponding to a process upon termination of the process.

FIG. 5 illustrates an example process for protecting memory locations through privilege attributes of pages while enabling operations on other memory locations associated with those pages. The process 500 includes, at 502, identifying memory locations of a subset of memory locations in memory of the computing device to be intercepted. In some implementations, the identified memory locations include a memory location associated with privileges for a process. In further implementations, the identified memory locations include a memory location associated with user credentials.

At 504, pages of the memory which include the identified memory locations may then be determined.

At 506, privilege attributes of the pages may then be set to prevent specific types of operations from affecting the memory locations. When the identified memory locations include a memory location associated with privileges for a process, the specific types of operations may include write operations and the setting includes setting the privilege attribute for the page including the memory location to a read only value to prevent writes to the memory location. When the identified memory locations include a memory location associated with user credentials, the specific types of operations may include read operations and setting includes setting the privilege attribute for the page including the memory location to an inaccessible value to prevent reads of the memory location.

At 508, an operation affecting another memory location associated with one of the pages which differs from the identified memory location associated with that page may be noted.

At 510, the privilege attribute of the one of the pages may then be temporarily reset to allow the operation.

Before, during, or after the operations shown at 508-510, an operation affecting the identified memory location may, at 512, be noted.

At 514, a process, thread, or module that requested the operation may then be identified.

At 516, responsive to noting the operation at 512, the privilege attribute of the page including the one of the identified memory locations may be temporarily reset to allow the operation. At 518, after temporarily resetting the privilege attribute, activities of the process, thread, or module may be monitored.

At 520, responsive to noting the operation at 512, a false indication of success for the operation may be returned. At 522, returning the false indication of success includes allowing the write operation to an alternate memory location and returning an indication that the write operation was successful. At 524, the read operation may be redirected to be performed on an alternate memory location storing false or deceptive user credentials. At 526, use of the deceptive credentials may then be monitored. In some implementations, redirecting to an alternate memory location may involve copying contents of the page including the identified memory location to a page which includes the alternate memory location storing the false or deceptive user credentials.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a processor;
a memory coupled to the processor;
a security agent configured to be operated by the processor to initiate a security agent component as a hypervisor for the system and determine a subset of memory locations in the memory to be intercepted; and
the security agent component configured to be operated by the processor to set intercepts for memory locations of the determined subset of memory locations and to set the intercepts by redirecting from the subset of memory locations to different memory locations.

2. The system of claim 1, wherein the security agent component is further configured to set the intercepts by setting privilege attributes for pages which include the memory locations of the determined subset of memory locations.

3. The system of claim 1, wherein the security agent is further configured to initiate the security agent component as the hypervisor by storing processor state settings in a data structure and instructing the processor to initiate the security agent component as the hypervisor based on the data structure.

4. The system of claim 3, wherein the security agent includes different routines for different operating systems, each of the different routines fixing as invariant a part of the data structure associated with the respective different operating system.

5. The system of claim 1, wherein the security agent is further configured to determine the subset of the memory locations based on a security agent configuration received from a security service.

6. The system of claim 1, wherein the security agent is further configured to request that an operating system kernel of the system lock page table mappings of the memory locations of the subset of memory locations.

7. The system of claim 1, wherein the security agent is further configured to determine instructions to be intercepted and the security agent component is further configured to set intercepts for the determined instructions.

8. The system of claim 1, wherein the security agent component is further configured to remove intercepts corresponding to a process upon termination of the process.

9. A non-transitory computer-readable medium having stored thereon executable instructions which, when executed by a computing device, cause the computing device to perform operations comprising:

identifying, by a security agent implemented on the computing device, memory locations of a subset of memory locations in memory of the computing device to be intercepted;
determining, by a security agent component of the security agent, the security agent component implemented as a hypervisor on the computing device, pages of the memory which include the identified memory locations;
setting, by the security agent component, privilege attributes of the pages to prevent specific types of operations from affecting the memory locations;
noting, by the security agent component, an operation affecting another memory location associated with one of the pages which differs from the identified memory location associated with that page; and
temporarily resetting, by the security agent component, the privilege attribute of the one of the pages to allow the operation.

10. The non-transitory computer-readable medium of claim 9, wherein the identified memory locations include a memory location associated with privileges for a process and the setting includes setting the privilege attribute for the page including the memory location to a read-only value to prevent writes to the memory location.

11. The non-transitory computer-readable medium of claim 9, wherein the identified memory locations include a memory location associated with user credentials and the setting includes setting the privilege attribute for the page including the memory location to an inaccessible value to prevent reads of the memory location.

12. A computer-implemented method comprising:
identifying, by a security agent implemented on a computing device, memory locations of a subset of memory locations in memory of the computing device to be intercepted;
determining, by a security agent component of the security agent, the security agent component implemented as a hypervisor on the computing device, pages of the memory which include the identified memory locations;
setting, by the security agent component, privilege attributes of the pages to prevent specific types of operations from affecting the memory locations;
noting, by the security agent component, an operation affecting one of the identified memory locations;
in response to noting the operation, either:
temporarily resetting, by the security agent component, the privilege attribute of the page including the one of the identified memory locations to allow the operation, or
returning, by the security agent component, a false indication of success for the operation.

13. The method of claim 12, wherein the operation is a write operation, the one of the identified memory locations is a memory location associated with privileges for a process and the setting includes setting the privilege attribute for the page including the one of the identified memory locations to a read only value to prevent write operations to the one of the identified memory locations.

14. The method of claim 13, wherein the returning the false indication of success includes allow the write operation to an alternate memory location and returning an indication that the write operation was successful.

15. The method of claim 12, wherein the operation is a read operation, the one of the identified memory locations is memory location associated with user credentials and the setting includes setting the privilege attribute for the page including the one of the identified memory locations to an inaccessible value to prevent reads of the one of the identified memory locations.

16. The method of claim 15, further comprising causing the read operation to be performed on an alternate memory location storing false or deceptive user credentials.

17. The method of claim 16, further comprising monitoring use of the deceptive credentials.

18. The method of claim 16, further comprising copying contents of the page including the one of the identified memory locations to a page which includes the alternate memory location storing the false or deceptive user credentials.

19. The method of claim 12, further comprising identifying a process, thread, or module that requested the operation.

20. The method of claim 19, further comprising, after temporarily resetting the privilege attribute, monitoring activities of the process, thread, or module.

21. The method of claim 19, further comprising terminating the process, thread, or module.

22. A system comprising:

a processor;

a memory coupled to the processor;

a security agent configured to be operated by the processor to initiate a security agent component as a hypervisor for the system and determine a subset of memory locations in the memory to be intercepted; and the security agent component configured to be operated by the processor to set intercepts for memory locations of the determined subset of memory locations and to intercept page out requests and prevent paging out of memory pages which include the memory locations that are to be intercepted, or to intercept page in requests in order to update knowledge of memory locations.

* * * * *